United States Patent [19]
Duchow et al.

[11] Patent Number: 5,676,982
[45] Date of Patent: Oct. 14, 1997

[54] LOZENGE CUTTER APPARATUS

[76] Inventors: Reinhardt W. Duchow, 3595 Genesee Lake, Oconomowoc, Wis. 53066; Carl E. Eyman, Jr., 1 Audubon Ct., Apt. C, Thibodaux, La. 70301

[21] Appl. No.: 555,498

[22] Filed: Nov. 8, 1995

[51] Int. Cl.⁶ ............................. A23G 7/00; B26D 1/00
[52] U.S. Cl. ..................... 425/298; 83/127; 83/128; 99/537; 425/315; 425/316; 425/444; 426/518
[58] Field of Search ...................... 425/298, 315, 425/316, 436 R, 444; 99/537; 83/127, 128, 312, 346; 426/518

[56] References Cited

U.S. PATENT DOCUMENTS 4,889,043  12/1989  Mani ........................................ 99/537
5,306,133   4/1994  Dayley .................................... 425/298

*Primary Examiner*—George Yeung
*Attorney, Agent, or Firm*—Pravel, Hewitt, Kimball & Krieger

[57] ABSTRACT

A lozenge candy cutting machine includes a drum with an array of cutter elements thereon that engage on dough web conveyed to the drum. A row of cutters cuts lozenges from the dough web. Each cutter element has an ejector that discharges the lozenge after cut and while the next group of cutters is already cutting another group of lozenges from the web.

10 Claims, 5 Drawing Sheets

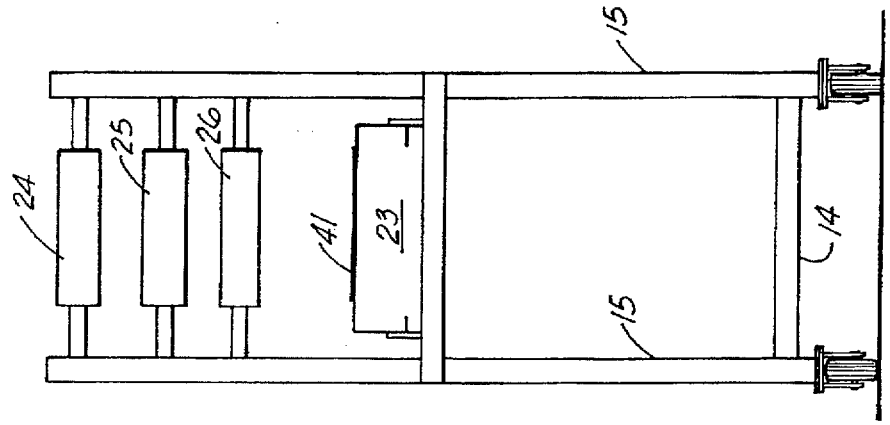
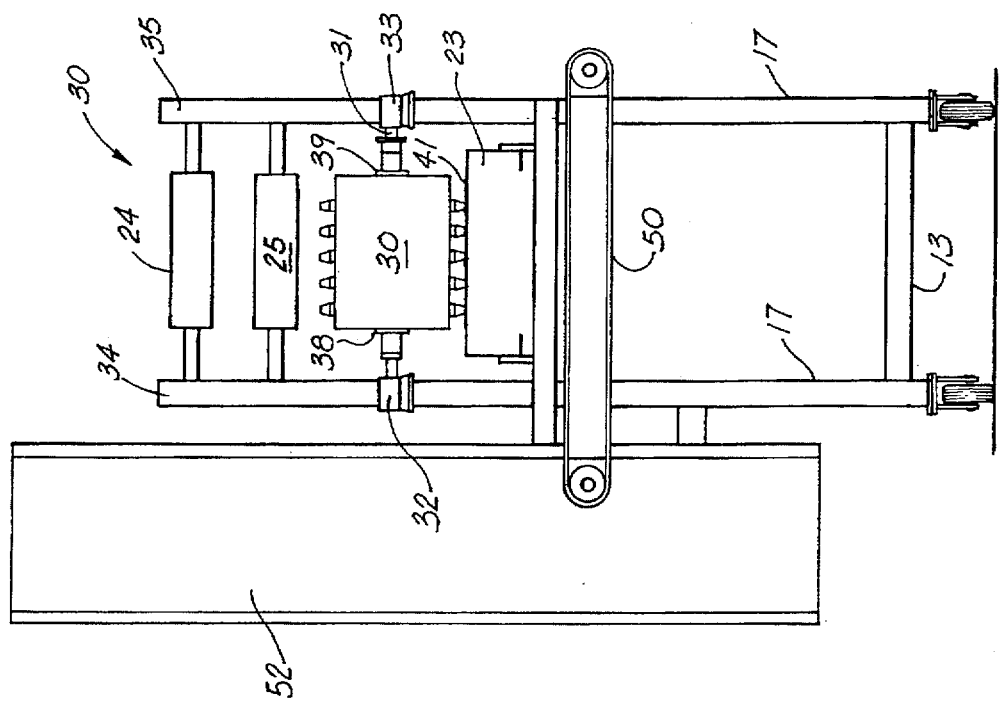

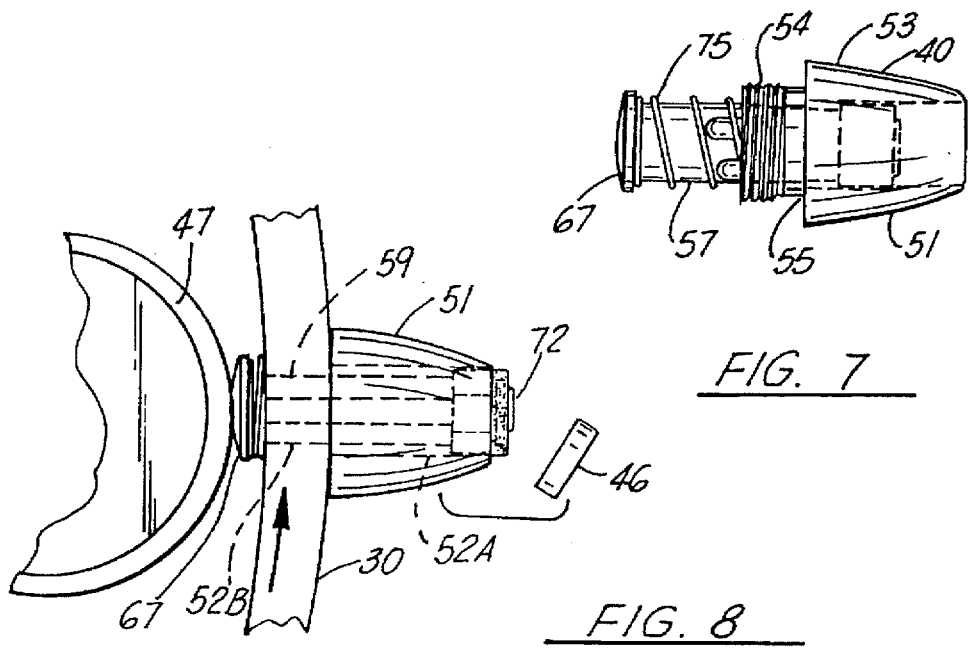
FIG. 7
FIG. 8
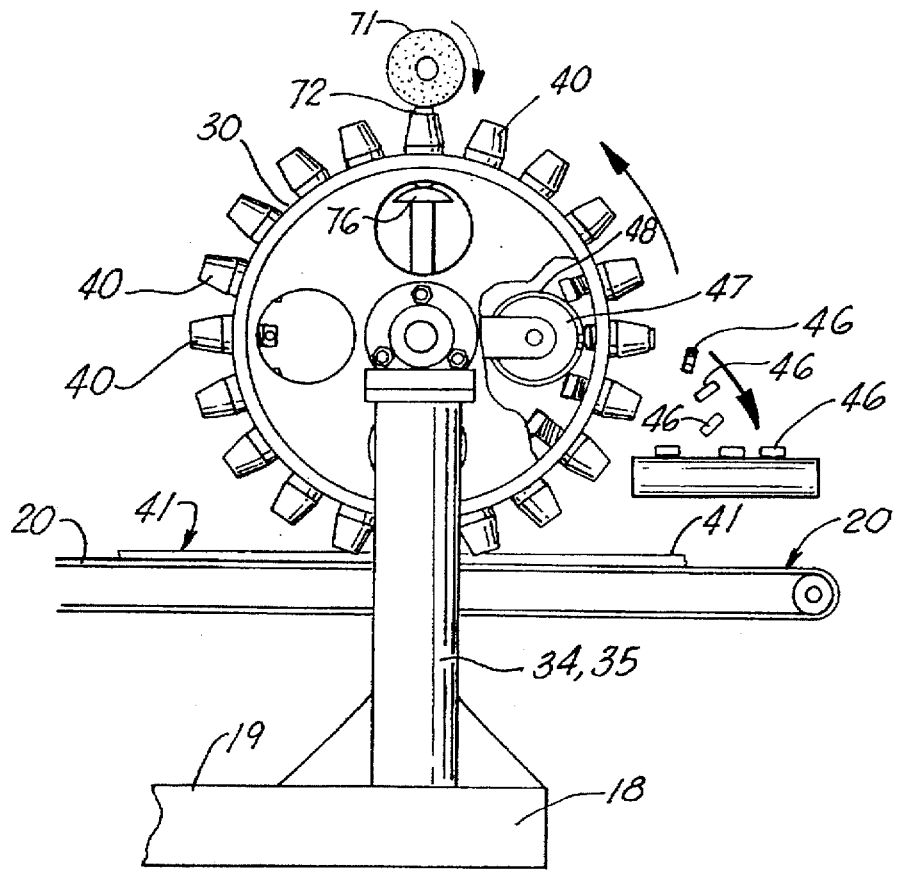
FIG. 9

LOZENGE CUTTER APPARATUS

BACKGROUND OF THE INVENTION

1. Field of the Invention

The present invention relates to candy making machines and more particularly and improved lozenge cutter that continuously cuts individual lozenges from a belt of material and wherein each cutter provides an injector for discharging each cut lozenge from the cutter after it has been cut from the belt, and wherein a plurality of cutters arranged circumferentially about a drum and in multiple rows on the drum can be used to maximize the number of lozenges cut from the drum and wherein continuous rotation of the drum permits continuous cutting of lozenges from the belt of material.

2. General Background

One of the common forms of candy is a lozenge which is manufactured without cooking or heat by simply mechanically mixing ingredients at or near room temperature. It is presently known in the art make lozenges by mixing a powdered sugar and one or more liquid binders at room temperature. The mix is then prepared in web form and continuously extruded at a desired thickness. The mixed dough is extruded into a blanket that is typically thicker than the desired final thickness.

The belted material is conveyed on a smooth conveyor belt dusted with starch or some other non-stick agent. The dough goes through one or more sets of calendar rolls to reduce it to a final thickness. It is then conveyed on another conveyor that carries the blanket under a plurality of cutters. In prior art type lozenge machines, the belt is advanced and then stopped so that cutters can engage the belt and cut lozenges of desired shaped such as circular, heart shaped, square, etc.

One of the problems with prior art type lozenge cutting machines is that they provide a discontinuous motion. Such a discontinuous stop and go motion requires energy to accelerate and energy to decelerate.

It is common to apply a printed message to lozenge type candy. Conventional machines in the prior art print the candy prior to cutting it. This creates a problem of registration or aa potential lack of registration. Simply put, the word message that is to appear on the front of the candy will not be centered in many cases.

In the conventional prior art machines, a number of cutters cut simultaneously such as for example 72 at one time. If one or more of these individual cut candies is damaged (for example by coming down upon a piece of dried candy in the dough) the entire manifold of 72 cutters must be removed from the machine so that the damaged ones can be repaired or replaced. With conventional lozenge cutting machines, when it becomes necessary to change from one product to another such as for example one shape to another shape, a manifold must be changed. Further, the bed height must be adjusted and the printing mechanism often changed. This process consumes hours of time, loosing productivity.

SUMMARY OF THE INVENTION

The present invention provides an improved lozenge cutting machine and an improved method of cutting lozenges from a continuous belt of dough product.

The present invention thus provides an improved method of cutting lozenges from a web of material. The web is first prepared by combining a majority of powdered sugar with a liquid binder. These ingredients are mechanically mixed at or near room temperature.

A dough product is continuously extruded of a desired thickness. Once the powdered sugar and binders are mixed. A plurality of small disk like candy elements are cut from the web continuously feeds through a cutter mechanism. In the preferred embodiment, the cutting mechanism includes a rotary drum having a plurality of individual cutter elements spaced circumferentially around the drum. Further, multiple rolls of cutters can be placed on the drum depending upon drum width.

Individual candy lozenge elements are ejected from each cutter after the candy element is cut from the web. The perforated web is recycled after the individual candy elements have been removed therefrom.

With the method of the present invention, printed messages can be placed within a bore of each cutter element so that the message is centered. The present invention provides a continuous rotary lozenge cutter machine that easily changes from one product to another. An easy change over from one product to another is accomplished by using a rotary drum having individual cutter elements that can quickly be removed from the drum and replaced with other elements of different size or shape.

With the present invention, the individual cutter elements are cam actuated so that complicated electrical parts are eliminated from any individual cutter. Rather, the individual cutter elements are entirely mechanically operated as the drum rotates.

The apparatus of the present invention thus provides an improved lozenge cutting apparatus that includes a machine frame and a cutter assembly supported upon the machine frame, preferably rotatably mounted thereon. The cutter assembly can include a rotating element such as a drum with a plurality of individual cutter elements mounted on the drum or like element. Each cutter element provides a bore and a piston slidably mounted within the bore.

A conveyor is provided for conveying a web of candy dough to the cutter assembly. The cutter element (for example a drum) rotates at a speed so that the individual cutter elements have a speed that tracks the speed of the web. In this fashion, each of the cutter elements engages the web to cut a lozenge therefrom that is of a shape that corresponds to the transverse section of the bore portion of each cutter element. Therefore, with the present invention, the speed of the cutter element and the speed of the web of dough can be coordinated to provide lozenge shapes that are accurate and not distorted.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 2 is an end view of the preferred embodiment of the apparatus of the present invention;

FIG. 3 is another end view of the preferred embodiment of the apparatus of the present invention;

FIG. 7 is a side fragmentary end view of the cutter unit of FIG. 6;

FIG. 8 is a side, fragmentary view of the unit shown in operation ejecting a completed lozenge; and FIG. 9 is a side view of the of the preferred embodiment of the apparatus of the present invention.

DETAILED DESCRIPTION OF THE PREFERRED EMBODIMENT

Figure 1:
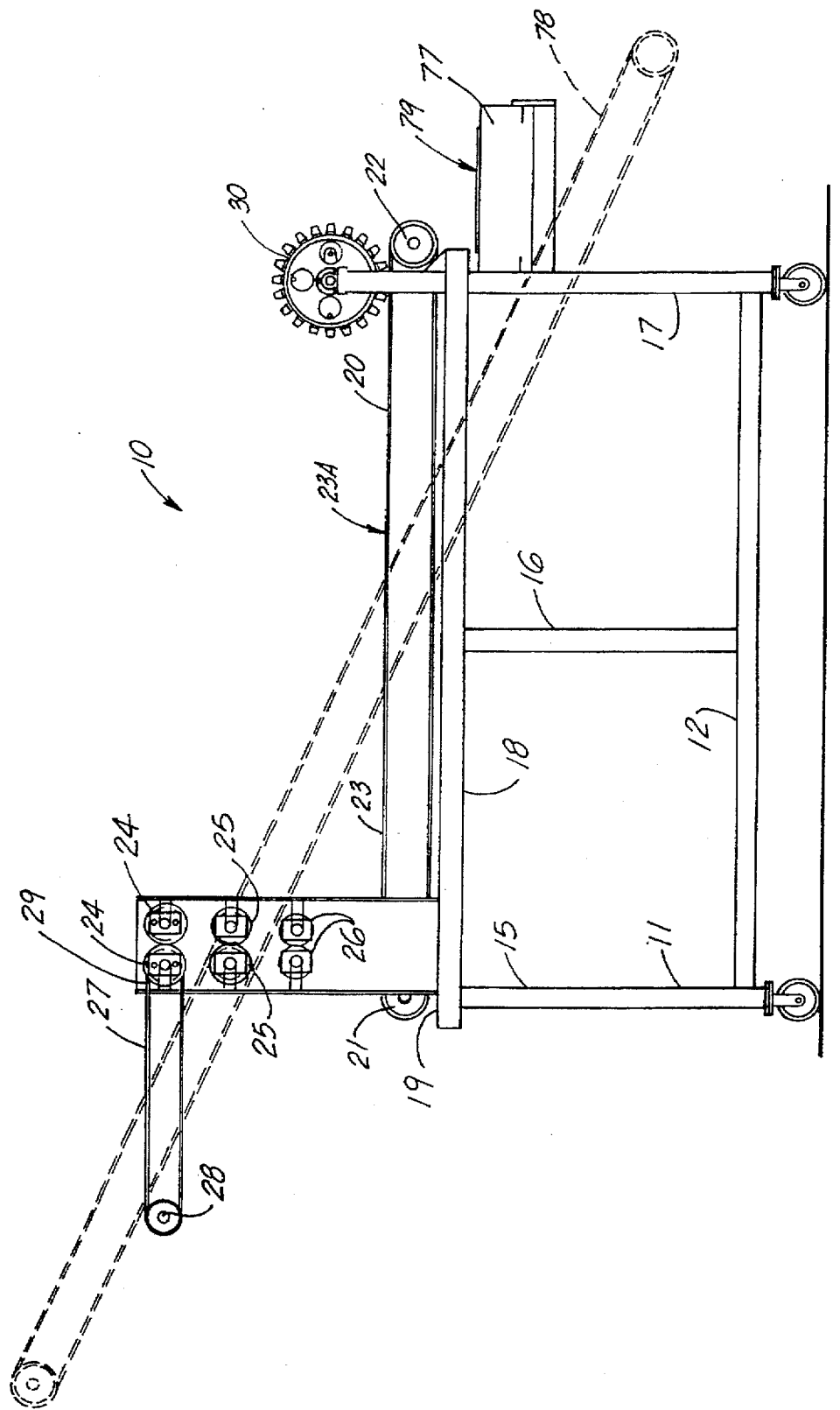
FIG. 1 is a front elevational view of the preferred embodiment of the apparatus of the present invention.
Figure 4:
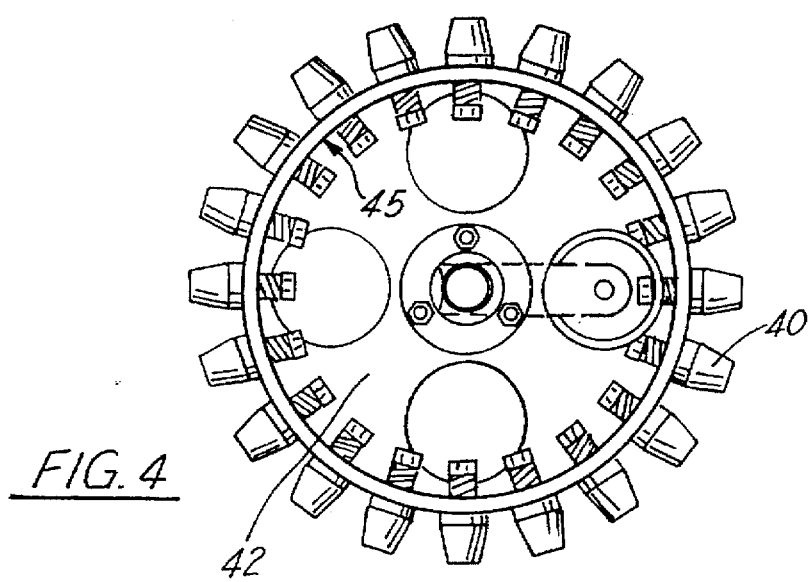
FIG. 4 is a fragmentary view of the preferred embodiment of the apparatus of the present invention illustrating the cutter assembly.

FIGS. 1–3 show generally the preferred embodiment of the apparatus of the present invention designated generally by the numeral 10. Lozenge cutting apparatus 10 includes a machine frame 11 that includes a plurality of horizontal members 12–14 and a plurality of vertical members 15–17. An upper most work surface 18 carries a first endless conveyor 19 that is spaced above the upper surface 19 of work surface 18. First endless conveyor 20 has a pair of sheaves 21, 22 that support endless belt 23 thereon.

Belt 23 carries a candy dough product from dough rollers 24–26 to cutter assembly 30. The dough rollers 24–26 can be for example three sets of dough rollers 24–26, each set 24–26 having a pair of opposed rollers as shown in FIG. 1. The rollers 24–26 are used to shape a web of dough material into a desired thickness so that when the dough hits the upper surface 23A of conveyor 23, it is of a desired candy thickness before it reaches the cutter assembly 30.

Conveyor 27 has a pair of sheaves 28, 29 and is used to transport a mixture that comprises the dough candy product dispensed from a standard commercially available extruder (not shown) to the three sets of dough rollers 24–26. Such extruders are sold by Werner Lehara, Inc. of Grand Rapids, Mich., as an example. The extruder is used in manner known in the art to mix powdered sugar and a binder (or binders) to create a dough web that will be cut with cutters to form multiple lozenge products. The combination of materials that are used to confect the candy dough when manufacturing lozenges is a mixture that is known in the art. A majority of the dough is powdered sugar. A plurality of liquid binders are used in combination with the powder sugar to arrive at the dough product.

Figure 5:
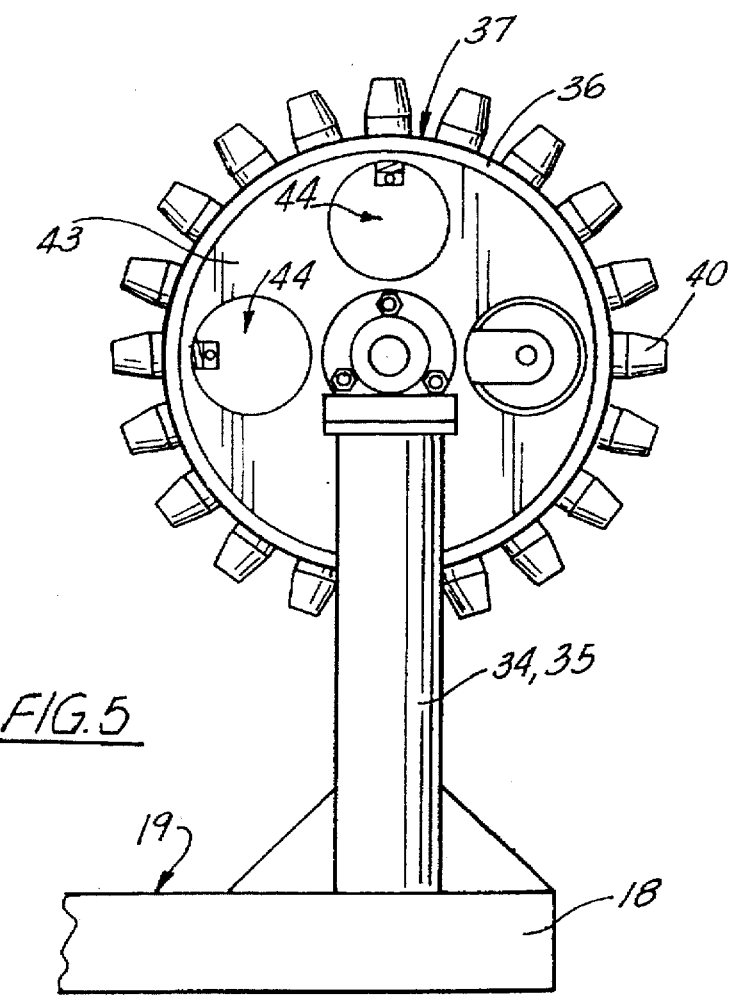
FIG. 5 is another fragmentary side view of the preferred embodiment of the apparatus of the present invention illustrating the rotary cutter assembly.

In FIGS. 1–2 and 5, the cutter assembly 30 is shown rotatably mounted upon machine frame 11 at shaft 31. The shaft 31 can be attached at bushings 32, 33 to vertical supports 34, 35 respectively. Cutter assembly 30 includes in the preferred embodiment a cylindrically shaped drum 36 having a cylindrical outer surface 37 to which are attached a plurality of individual cutter elements 40. Shaft 31 is mounted at a pair of bearing 38, 39 to drum 36. Thus, the shaft 31 can be non-rotating member.

The drum 36 and its bearings 38, 39 rotate and are driven by a chain not shown. The chain can be driven by an electric motor at a desired speed so that the speed of the cutter elements 40 tracks the speed of the web of candy 41 that is fed to the cutter 30 as shown in FIGS. 2–3 upon the upper surface 23A of conveyor 23.

Drum 36 is cylindrically shaped and has a pair of circular end plates 42, 43. Each of the end plates 42, 43 can provide a plurality of openings 44 that allow the user to access the inner surface 45 of drum 36 so that the user can easily access both sides of an individual cutter element 40 for removing same such as when changing to a lozenge product of a different shape. Bushings 38, 39 can be ultra high molecular weight plastic bushings for example.

After the web of dough 41 is perforated to produce a plurality of individual lozenge elements 4, the perforated web is recycled. The perforated web first engages dough return conveyor 77 and thereafter a second dough return conveyor 78. shown in FIG. 1 in phantom lines. In this fashion, the perforated web, designated as 79 in FIG. 1 can be returned to the mixer.

Figure 6:
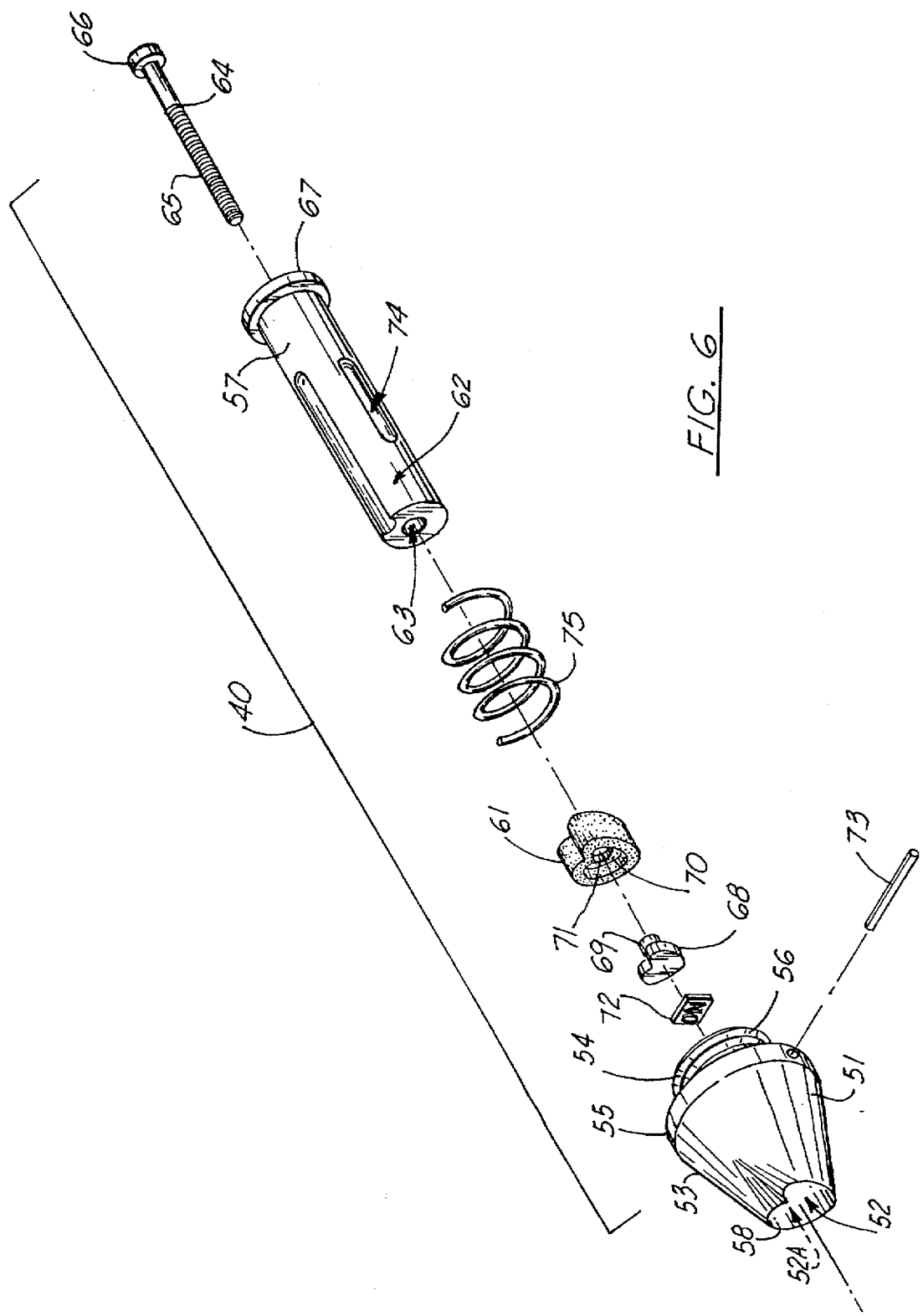
FIG. 6 is an exploded perspective fragmentary view of the preferred embodiment of the apparatus of the present invention illustrating an individual cutter unit.

Each cutter element 30 cuts an individual lozenge element 46 from the dough web 41 as the drum 36 rotates. In order to eject the individual lozenge element 46 from its respective cutter element 40, a cam 47 is provided that works in concert with a piston 57 of each cutter element 40. In FIG. 6, the piston 57 is sized and shaped to slide within bore 52 of cutter element 30 housing 51. Housing 51 can be manufactured of a hard plastic such as nylon for example having a hollow bore 52 that is open ended. Bore 52 is typically shaped at the discharge end portion to provide the final shape of the lozenge element 46 such as the heart shaped discharged end portion 58 in FIG. 6.

The housing 51 includes a generally frustoconically shaped body portion 53 and connected thereto a smaller diameter section 54 that is generally cylindrically shaped. Smaller diameter section 54 includes threads 56 that allow the housing 51 to be threadably affixed to the drum 36 at a provided correspondingly threaded opening 59 in the drum wall as shown in FIG. 8. An annular shoulder 55 extends between smaller diameter section 54 and the conical portion 53. Bore 52 has an annular step or shoulder that defines a change in diameter of bore 52. A felt washer 61 is preferably sized and shaped to correspond to the size and shape of ejector nut member 68. The washer 61 is used as a wiper to keep bore 52 clean. The bore 52 thus has a heart shaped larger cross-sectional area portion 52a and a smaller diameter cylindrically section 52b that conforms generally to the outer surface 62 of piston 57. Piston 57 has a hollow cylindrically shaped bore 63 that receives an assembly bolt 64 having a threaded 65 portion and an enlarged head 66. Enlarged head 66 registers with the end 67 of piston 65. The threaded portion 57 threadably engages ejector nut 68 having a bushing 69 that is internally threaded. Felt washer 61 is soft, and may develop a small recess 70 during use that cradles ejector nut 68. Printed matter can be contained on die 72. The die member 72 strikes an ink roller 71 when cam 76 forces piston 57 to the extended position, exposing die 72.

Spring 75 loads piston 57 in a retracted position as shown in FIG. 7. Pin 73 is mounted in housing 51, and extends through slot 74 of piston 57. The ends of slot 74 act as a stop to limit travel of pin 73. However, when a particular cutter element 40 engages cam 47 and more particularly the cylindrically shaped outer surface 48 thereof, the piston 56 is moved to a discharge position as shown in FIG. 8. In this position, the spring 75 is overcome, thus compressing the spring 75 and moving the piston 57 to the position shown in FIG. 8 so that the ejector nut 68 discharges a lozenge element 46 imprinting it with message contained on die 72.

In FIG. 9, it can be seen that the apparatus 10 of the present invention can dispense multiple lozenge elements 46 in a rapid manner by simply increasing the speed of the web 41 and the speed of rotation of the drum 36. Further, the drum 36 can be made very wide so that multiple rows of circumferentially spaced ejectors 40 can be included. In this fashion, 10, 15, or 20 lozenges can be cut each time a transversely extending row of cutter elements 30 engages the web 41.

The following table lists the parts numbers and parts descriptions as used herein and in the drawings attached hereto.

PARTS LIST

| Part Number | Description |
| --- | --- |
| 10 | candy making machine |
| 11 | machine frame |
| 12 | horizontal member |
| 13 | vertical member |
| 14 | vertical member |
| 15 | vertical member |
| 16 | vertical member |
| 17 | vertical member |
| 18 | work top |
| 19 | upper surface |
| 20 | conveyor |
| 21 | sheave |
| 22 | sheave |
| 23 | conveyor belt |
| 23A | upper surface |
| 24 | dough roller |
| 25 | dough roller |
| 26 | dough roller |
| 27 | conveyor |
| 28 | sheave |
| 29 | sheave |
| 30 | cutter assembly |
| 31 | shaft |
| 32 | support |
| 33 | support |
| 34 | vertical column |
| 35 | vertical column |
| 36 | cylindrical drum |
| 37 | cylindrical outer surface |
| 38 | rotary bearing |
| 39 | rotary bearing |
| 40 | cutter element |
| 41 | dough web |
| 42 | end plate |
| 43 | end plate |
| 44 | opening |
| 45 | inner surface |
| 46 | lozenge element |
| 47 | cam |
| 48 | outer surface |
| 49 | cam arm |
| 50 | rotary support |
| 51 | housing |
| 52 | bore |
| 52a | larger section |
| 52b | smaller section |
| 53 | frustoconically-shaped portion |
| 54 | smaller diameter section |
| 55 | annular shoulder |
| 56 | threads |
| 57 | piston |
| 58 | discharge end |
| 59 | threaded opening |
| 60 | shoulder |
| 61 | ejector |
| 62 | outer surface |
| 63 | bore |
| 64 | bolt |
| 65 | threads |
| 66 | end |
| 67 | end |
| 68 | nut |
| 69 | bushing |
| 70 | recess |
| 71 | ink roller |
| 72 | dye |
| 73 | pin |
| 74 | slot |
| 75 | spring |
| 76 | cam |
| 77 | conveyor |
| 78 | conveyor |
| 79 | perforated web |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A lozenge candy cutting apparatus comprising:

a) a machine frame;

b) a cutter assembly supported by the frames;

c) a plurality of cutter elements mounted on the cutter assembly each element having a bore with a transverse section and a piston slidably mounted within the bore;

d) a conveyor for conveying a moving web of candy dough to the cutter elements;

e) means for coordinating speed of the web with the speed of each cutter element so that each of the cutter elements engages the moving web to cut a lozenge from the moving web, each lozenge having a shape that corresponds to the transverse section of the bore.

2. The lozenge candy cutting apparatus of claim 1 further comprising means for continuously moving the web for enabling a plurality of lozenges to be sequentially cut from the moving web.

3. The lozenge candy cutting apparatus of claim 1 wherein the moving web of candy has parallel edge portions.

4. The lozenge candy cutting apparatus of claim 1 wherein the cutter elements comprise a cutter body having a hollow bore, a cutting edge positioned at one end of the bore, and a piston slidably mounted in the bore.

5. The lozenge candy cutting apparatus of claim 4 further comprising a spring for urging the piston to a retracted position.

6. The lozenge candy cutting apparatus of claim 5 further comprising a cam for pushing the piston into a projected position wherein a lozenge contained within the bore is ejected from the bore.

7. The lozenge candy cutting apparatus of claim 1 wherein each of the cutter elements comprises a cutter body having a hollow bore, a cutting edge positioned at one end of the bore, a piston slidably mounted in the bore, and an printing surface for transferring a design from the printing surface to the surface of the lozenge candy.

8. The lozenge candy cutting apparatus of claim 1 wherein the cutting assembly includes a rotating drum and there are a plurality of cutter elements disposed circumferentially about the drum.

9. The lozenge candy cutting apparatus of claim 1 wherein the cutting assembly includes a rotating drum, a plurality of cutter elements disposed circumferentially about the drum, and a motor drive for rotating the drum.

10. The lozenge candy cutting apparatus of claim 1 wherein the cutting assembly includes a rotating drum, a plurality of cutter elements disposed circumferentially and transversely about the drum, and a motor drive for rotating the drum.

* * * * *